P. M. ELLIOTT.
FREIGHT CAR DOOR.
APPLICATION FILED FEB. 4, 1913.
1,088,774.
Patented Mar. 3, 1914.
3 SHEETS—SHEET 2.
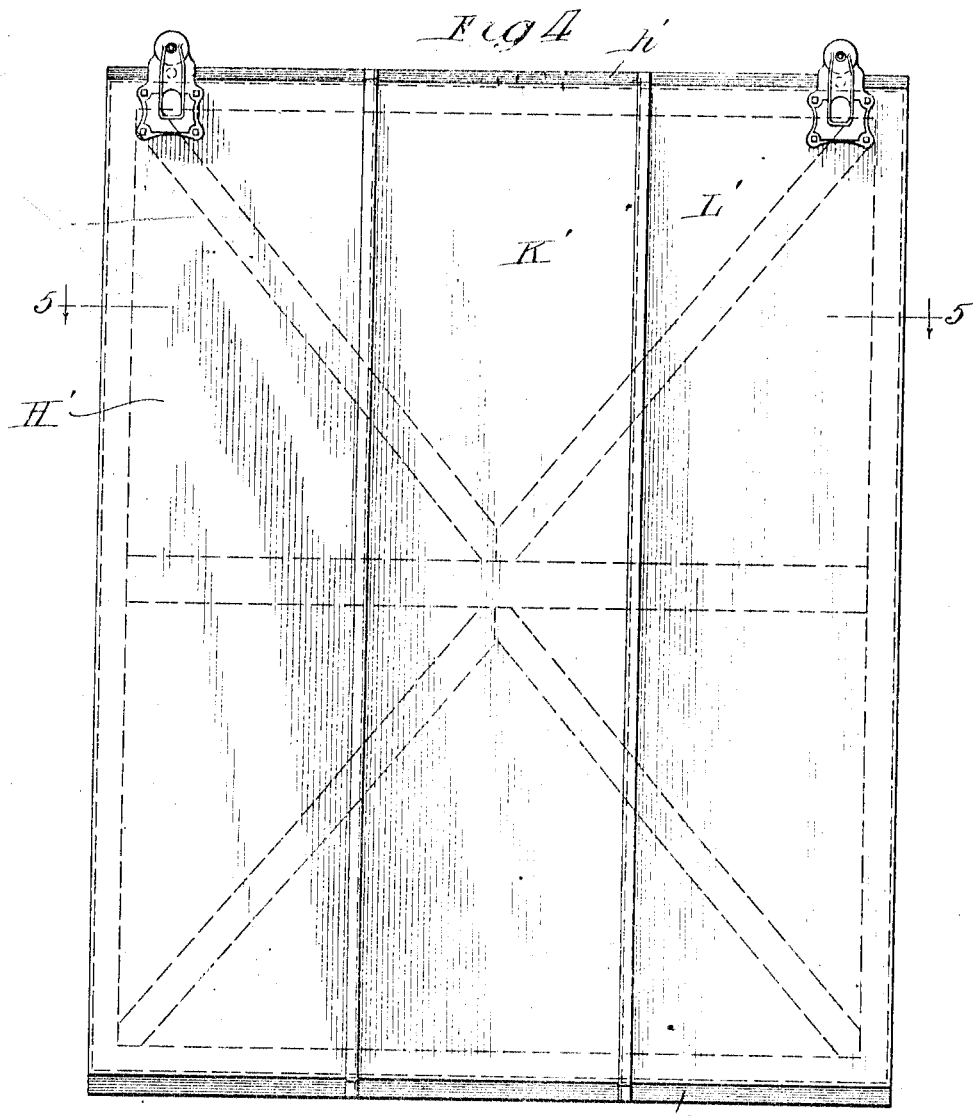
Witnesses:
Harry S. Gaither
Inventor:
Percy M. Elliott
by Sheridan, Wilkinson, Scott & Richmond
Attys P. M. ELLIOTT.
FREIGHT CAR DOOR.
APPLICATION FILED FEB. 4, 1913.
1,088,774.
Patented Mar. 3, 1914.
3 SHEETS—SHEET 3.
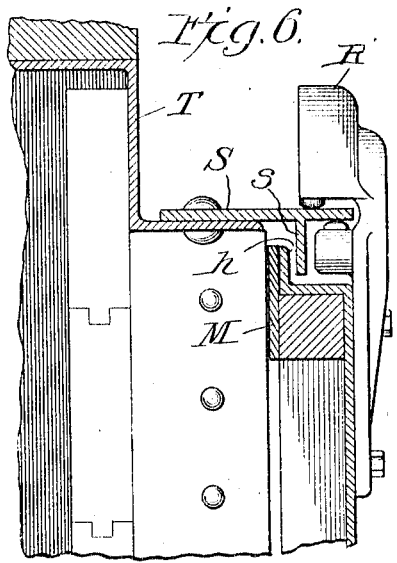
Fig. 6.
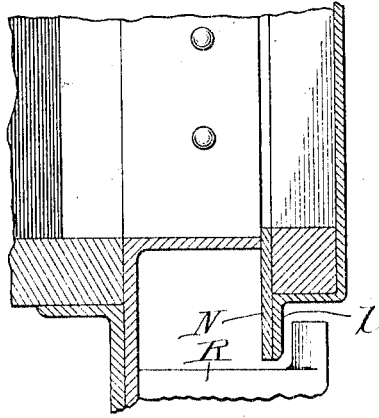
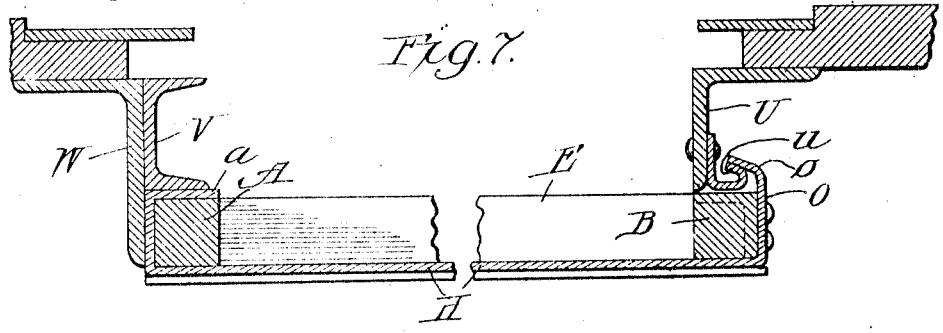
Fig. 7.
Witnesses:
Harry S. Gaither
Anna L. Walton
Inventor.
Percy M. Elliott
by Sheridan, Wilkinson, Scott & Richmond
Attys

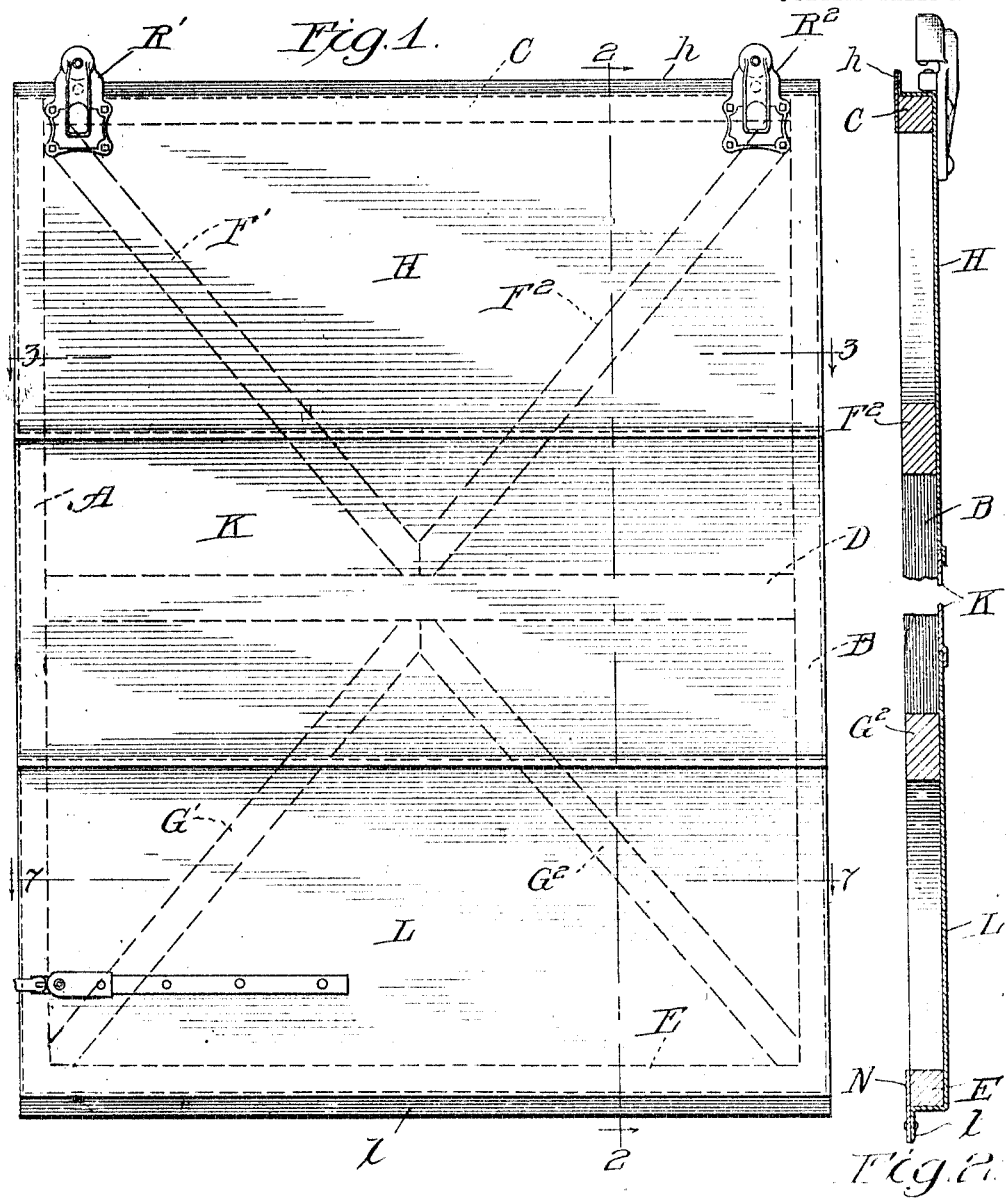

UNITED STATES PATENT OFFICE.

PERCY M. ELLIOTT, OF CHICAGO, ILLINOIS.

FREIGHT-CAR DOOR.

1,088,774.   Specification of Letters Patent.   Patented Mar. 3, 1914.

Application filed February 4, 1913. Serial No. 746,114.

*To all whom it may concern:*

Be it known that I, PERCY M. ELLIOTT, a citizen of the United States, residing at Chicago, in the county of Cook and State of Illinois, have invented certain new and useful Improvements in Freight-Car Doors, of which the following is a specification.

My invention relates in general to freight cars, and more particularly to freight car doors.

The sliding doors of freight cars are, owing to their exposed positions at the sides of the cars, subjected to a great deal of wear and tear, and when made entirely of wood must be quite heavy in order to possess the requisite strength, and even then they are frequently injured through contact with adjacent objects. Furthermore, in order that there may be weather and dust proof joints between the peripheral edges of the door and the frame around the door opening, it is necessary that strips should be secured to the door to overlap or interlock with strips secured around the door opening.

The primary object of my invention is to provide a reinforced sheet metal door for freight cars, which will possess the necessary structural strength with minimum weight, and in which the metal of which the door is composed may be provided with integral strips or flanges to form dust and weather-proof joints around the door to protect the contents of the car.

A further object of my invention is to provide a freight car door which will be simple in construction and durable in use, and will possess maximum strength with minimum weight.

My invention will be more fully disclosed hereinafter with reference to the accompanying drawings, in which the same is illustrated as embodied in several convenient and practical forms, and in which—

Figure 1 is an elevational view of one form of my invention; Fig. 2, a vertical section on line 2—2, Fig. 1; Fig. 3, a horizontal section on line 3—3, Fig. 1; Fig. 4, a view similar to Fig. 1, showing a modified arrangement of the sheet metal covering of the door; Fig. 5, a sectional view on line 5—5, Fig. 4; Fig. 6, an enlarged vertical section, showing my improved door and the adjacent coöperating parts of the car side, the central portion being broken away; and Fig. 7, a horizontal sectional view, the central portion thereof being broken away.

Similar reference characters are used to designate similar parts in the several figures of the drawings.

Referring more particularly to Figs. 1, 2 and 3, reference letters A and B designate the vertical members of the door frame which are connected by the transverse members C, D and E. The vertical and transverse members of the door frame are strengthened by means of pairs of diagonals F' and F², and G' and G² extending from the corners of the frame to the center thereof.

Secured to the outer surface of the door frame is a sheet metal covering preferably composed of sections H, K and L. The adjoining edges of the said sections are overlapped, in the manner shown in Fig. 2, to form weather-proof joints. The upper edge of the top section H of the sheet metal covering is bent around the upper surface of the top horizontal member C of the door frame, and is then bent upwardly to form a flange $h$ projecting in substantially the plane of the inner surface of the door frame. The vertical front edge of the sheet metal door covering is bent around the vertical member A of the door frame so as to form vertical plates which will protect the frame and will also closely engage the stop plate when the door is closed, as will be subsequently described.

The lower edge of the sheet metal covering is bent inwardly around the lower member E of the door frame and thence downwardly to form a depending flange $l$. The rear edge of the sheet metal covering is bent around the rear surface of the vertical member B of the door frame, and is thence bent inwardly to form a weather strip $o$, as shown in Fig. 3.

In order to more fully protect the frame of the door, and to add the requisite structural strength to the door, a plate M is secured along the inner surface of the top member C of the frame, while a plate N is secured along the inner surface of the lower member E of the frame and overlaps the downwardly projecting flange $l$. A vertical angle strip O is also provided around the inner and rear surface of the vertical member B of the frame, as shown in Fig. 3.

In lieu of forming the sheet metal covering in horizontal overlapping sections—as shown in Figs. 1, 2 and 3—it may be formed in a plurality of vertical overlapping sections, such as shown in Figs. 4 and 5, in which H', K' and L' indicate the sections of the sheet metal door covering, the latter being bent to extend around the vertical and horizontal peripheral members of the door frame, in the same manner as above described in connection with Figs. 1, 2 and 3.

In Figs. 4 and 5, a' indicates the reinforcing plate extending around the front vertical member A' of the door frame, while reference character h' designates the upwardly projecting flange formed integrally with the upper edge of the sheet metal covering. l' indicates a downwardly projecting flange formed integrally with the lower edge of the sheet metal door covering and o' the inwardly projecting strip formed integrally with the rear edge of the metal door covering, and extending around the reinforcing angle strip O'.

The functions to be performed by the marginal flanges, plates and strips formed integrally with the sheet metal door covering, will be more clearly understood by reference to Figs. 6 and 7, in which T indicates a horizontal Z-bar side plate intermediate of the top of the car side and the overlying portion of the roof, and arranged with one flange projecting outwardly over the door opening.

S designates a track secured to the outwardly projecting horizontal flange of the Z-beam T upon which is supported the door through the medium of the usual hangers R' and R². The track S is provided with a depending flange s which overlaps the upwardly projecting flange h formed along the top of the door so as to insure the proper guiding of the door in its opening and closing movements, and also so as to form an obstruction to the ingress of dust and foreign matter between the top of the door and overlying track. By reference to Fig. 7, it will be seen that the portion of the sheet metal plate which is bent around the front vertical member A of the door frame engages the outwardly projecting flange of the angle bar W which forms the door post, and rests against the outer flange of the channel beam door jamb V. The inwardly extending strip o which extends around the rear of the door frame engages a weather strip u secured to the rear door post U, thereby forming a weather and dust proof joint at the rear of the door when it is closed. The depending flange l, together with the reinforcing plate N, form a guide at the lower edge of the door to be engaged by the door guide brackets R in the opening and closing movements of the door.

In the preferred embodiments of my invention above described, the door frame is shown as made of wood to which the sheet metal covering is secured and around which it is bent to form the horizontal guide and weather strips and flanges.

From the foregoing description it will be observed that I have invented an improved door for freight cars comprising a door frame and a sheet metal door covering secured to the frame and bent around the same so as to form the guide flanges and weather strips for coöperating with the track, door guide brackets, and door posts to guide the door in its opening and closing movements and to form dust and weather-proof joints around the door when closed.

It will be further observed that by my improvements a car door may be constructed which will possess the structural strength necessary to withstand the hard usage to which car doors are subjected, and which at the same time will be comparatively light and inexpensive to manufacture.

I claim:

1. In a freight car door, the combination with a rectangular wooden door frame, of a sheet metal covering secured to the outer side of said frame and bent around the periphery thereof, a flange formed integrally with the upper edge of said metal covering and projecting upwardly therefrom in substantially the plane of the inner surface of said frame, a reinforcing plate overlying the inner flush surfaces of said flange and adjacent frame member, a flange formed integrally with the bottom edge of said metal covering and projecting downwardly therefrom in substantially the plane of the inner surface of said frame, and a reinforcing plate overlying the inner alined surfaces of said latter flange and the adjacent lower frame member.

2. In a freight car door, the combination with a wooden door frame, of a sheet metal covering secured to the outer side of said frame and bent around the periphery thereof, a flange formed integrally with the upper edge of said metal covering and projecting upwardly therefrom in substantially the plane of the inner surface of said frame, a reinforcing plate overlying the alined inner surfaces of said flange and adjacent member of said frame, a flange formed integrally with the rear edge of said metal covering and projecting inwardly therefrom so as to form a weather strip adapted to overlap a coöperating strip at the rear of the door opening, a reinforcing plate overlying the inner surface of the rear wooden frame member, and a jamb plate formed integrally with the front edge of said metal covering and overlying the inner surface of the front member of said frame so as to engage the door jamb at the front of the door when the door is closed.

3. In a freight car door, the combination with a wooden door frame, of a sheet metal covering secured to the outer side of said frame and bent around the periphery thereof, a flange formed integrally with the upper edge of said metal covering and projecting upwardly therefrom in substantially the plane of the inner surface of said frame, a reinforcing plate overlying the alined inner surfaces of said flange and adjacent member of said frame, a flange formed integrally with the rear edge of said metal covering and projecting inwardly therefrom so as to form a weather strip adapted to overlap a coöperating strip at the rear of the door opening, a jamb plate formed integrally with the front edge of said metal covering and overlying the inner surface of the front member of said frame so as to engage the door jamb at the front of the door when the door is closed, a flange formed integrally with the lower edge of said metal covering and depending therefrom from the plane of the inner surface of said frame to engage door guide brackets, and a bottom reinforcing plate overlying the alined inner surfaces of said latter flange and the adjacent member of said frame.

4. In a freight car having a door opening in its side wall, a track above the door opening having a depending flange thereon, a vertical weather strip at the rear of the door opening, a door comprising a wooden door frame and a sheet metal covering secured thereto, hangers for suspending the door from said track, a flange formed integrally with the upper edge of said metal covering and projecting upwardly therefrom to overlap the depending flange on said track, the reinforcing plate overlying the alined inner surfaces of said flange and the adjacent member of said frame, a flange formed integrally with the rear edge of said metal covering and projecting inwardly therefrom so as to overlap said vertical weather strip when the door is closed, and a reinforcing plate overlying the inner surfaces of the rear member of the door frame.

5. In a freight car having a door opening in its side wall, a track above the door opening having a depending flange thereon, door guide brackets below the door opening, a vertical post at the front of the door opening, a vertical weather strip at the rear of the door opening, a door comprising a wooden frame and a sheet metal covering secured thereto, hangers for supporting said door from said track, a flange formed integrally with the upper edge of said metal covering and projecting upwardly therefrom to overlap the depending flange of the said track, a reinforcing plate overlying the alined inner surfaces of said flange and adjacent member of said frame, a flange formed integrally with the rear edge of said metal covering and projecting inwardly therefrom so as to overlap the said vertical weather strip, a jamb plate formed integrally with the front edge of said metal covering and extending around the front member of the door frame so as to engage the front door post when the door is closed, a flange formed integrally with the lower edge of said metal covering and depending therefrom between the door guide brackets and the car side, and a reinforcing plate overlying the alined inner surfaces of said latter flange and the adjacent member of the door frame.

In testimony whereof, I have subscribed my name.

PERCY M. ELLIOTT.

Witnesses:
 ANNA L. WALTON,
 HENRY A. PARKS.